Patented Nov. 7, 1922.

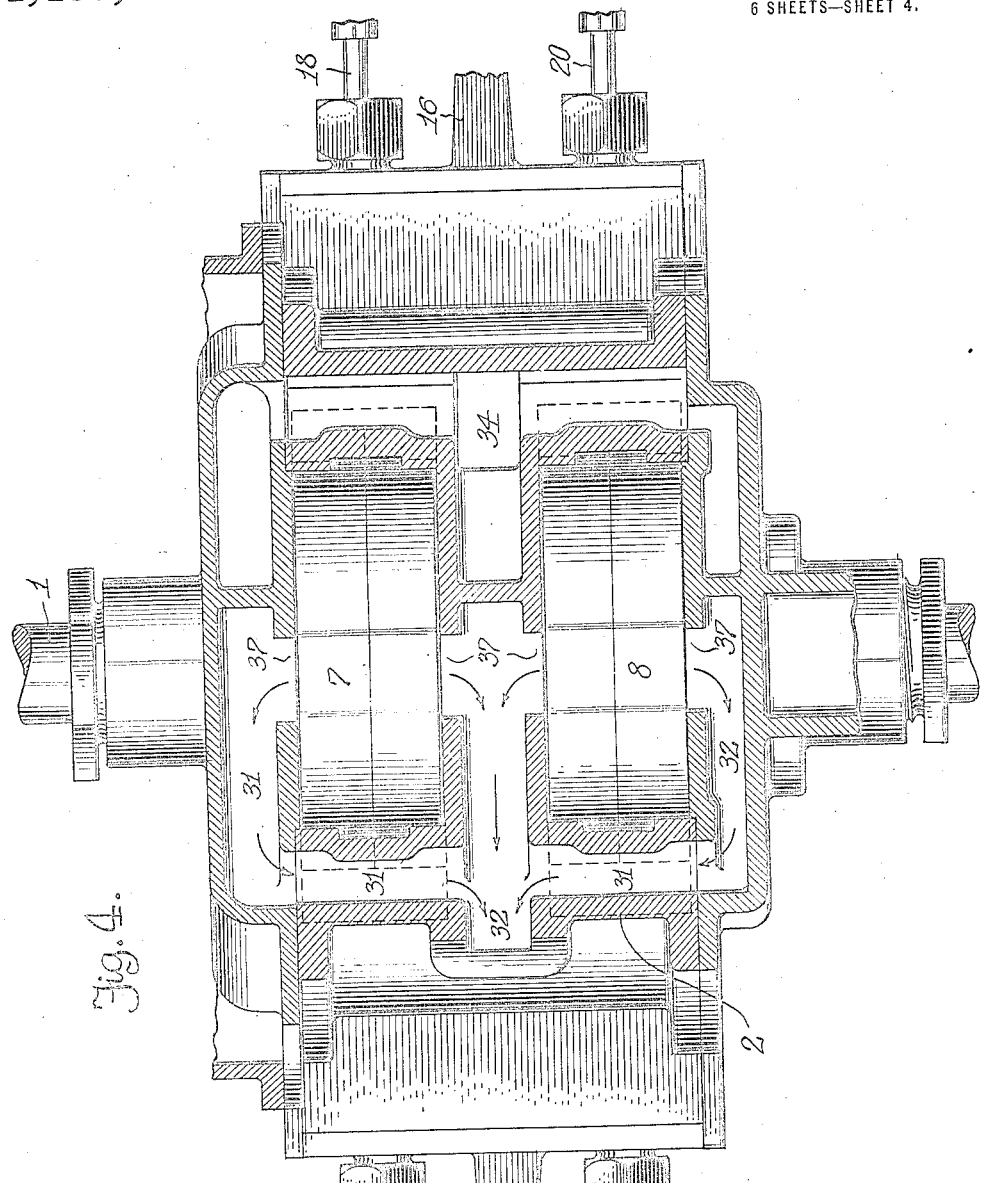

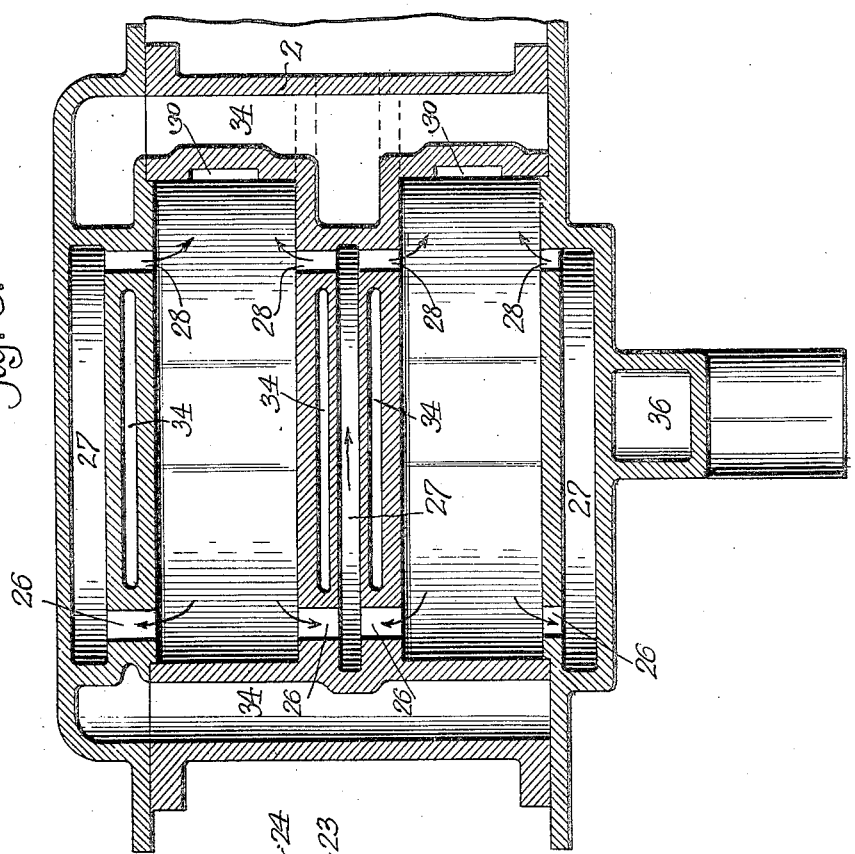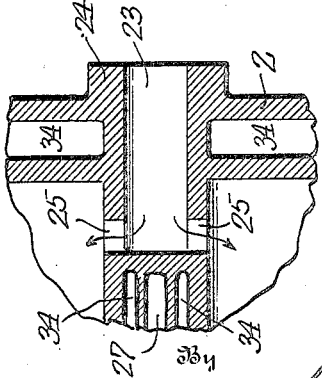

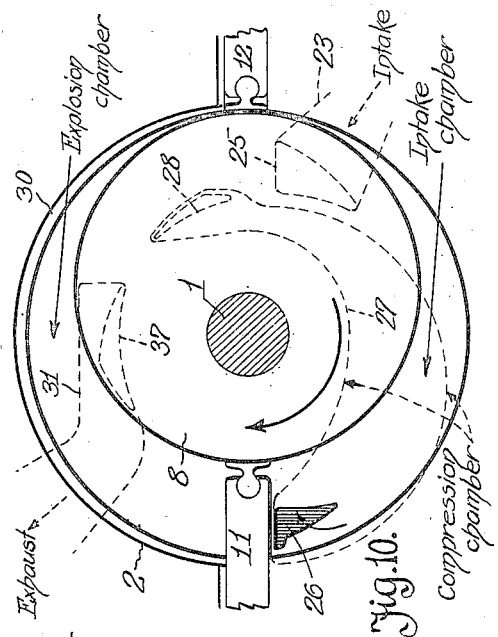
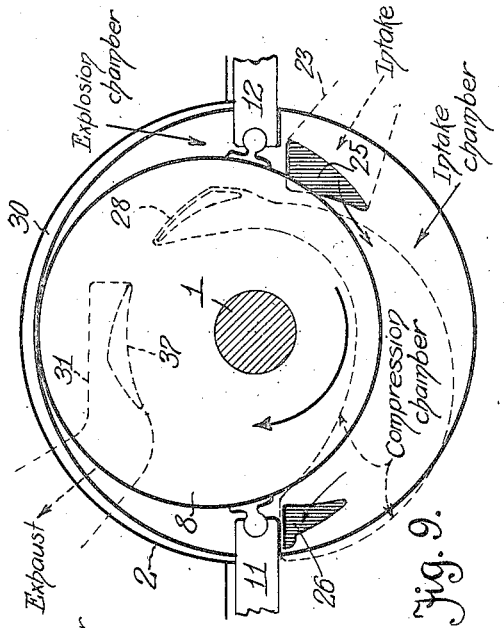
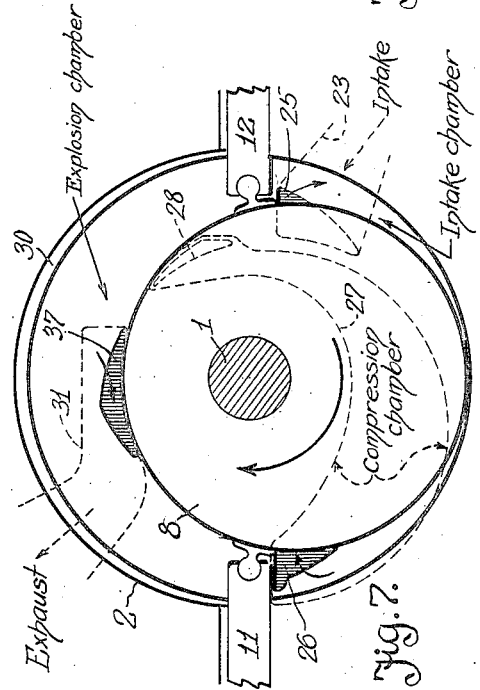
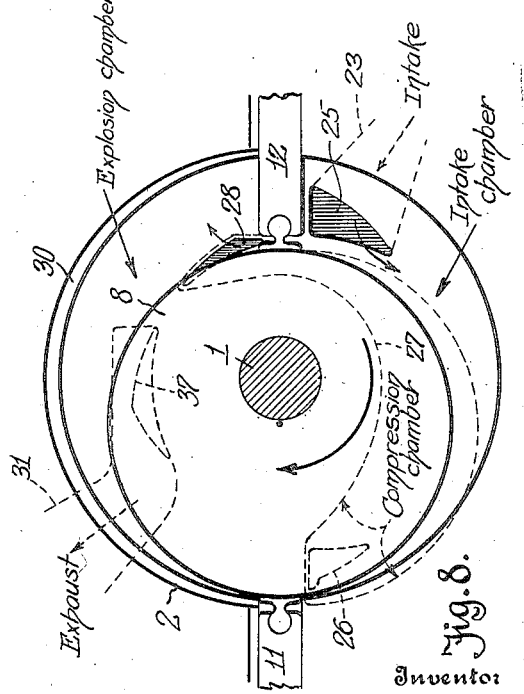

1,434,446

UNITED STATES PATENT OFFICE.

JAMES W. McQUEEN, OF WATERVLIET, MICHIGAN.

ROTARY ENGINE.

Application filed November 25, 1918. Serial No. 264,013.

*To all whom it may concern:*

Be it known that I, JAMES W. McQUEEN, a citizen of the United States of America, residing at Watervliet, in the county of Berrien and State of Michigan, have invented certain new and useful Improvements in Rotary Engines, of which the following is a specification, reference being had therein to the accompanying drawings.

This invention relates to rotary internal combustion motors and to an arrangement thereof whereby great power per weight is obtained together with simplicity of construction.

The invention consists in the matters hereinafter set forth, and more particularly pointed out in the appended claims.

In the drawings,

Fig. 4 is a view, partially in plan, and partially in section on or about line IV—IV of Fig. 3, with portions removed, showing exhaust passages and ports;

Fig. 5 is a view in section taken on or about line V—V of Fig. 3, with pistons removed, showing compression chambers and ports;

Fig. 6 is a view in section, on or about line VI—VI of Fig. 3, illustrating the intake passage and ports to the piston chambers or cylinders;

Fig. 7 is a diagram showing the piston at fullest expansion position after explosion, with exhaust open, and intake port partially uncovered and the compression port to the compression chamber open;

Fig. 8 is a diagram illustrating the piston advanced one quarter of a revolution from the position in Fig. 7, with the outlet port from the compression chamber into the explosion chamber open;

Figure 1:
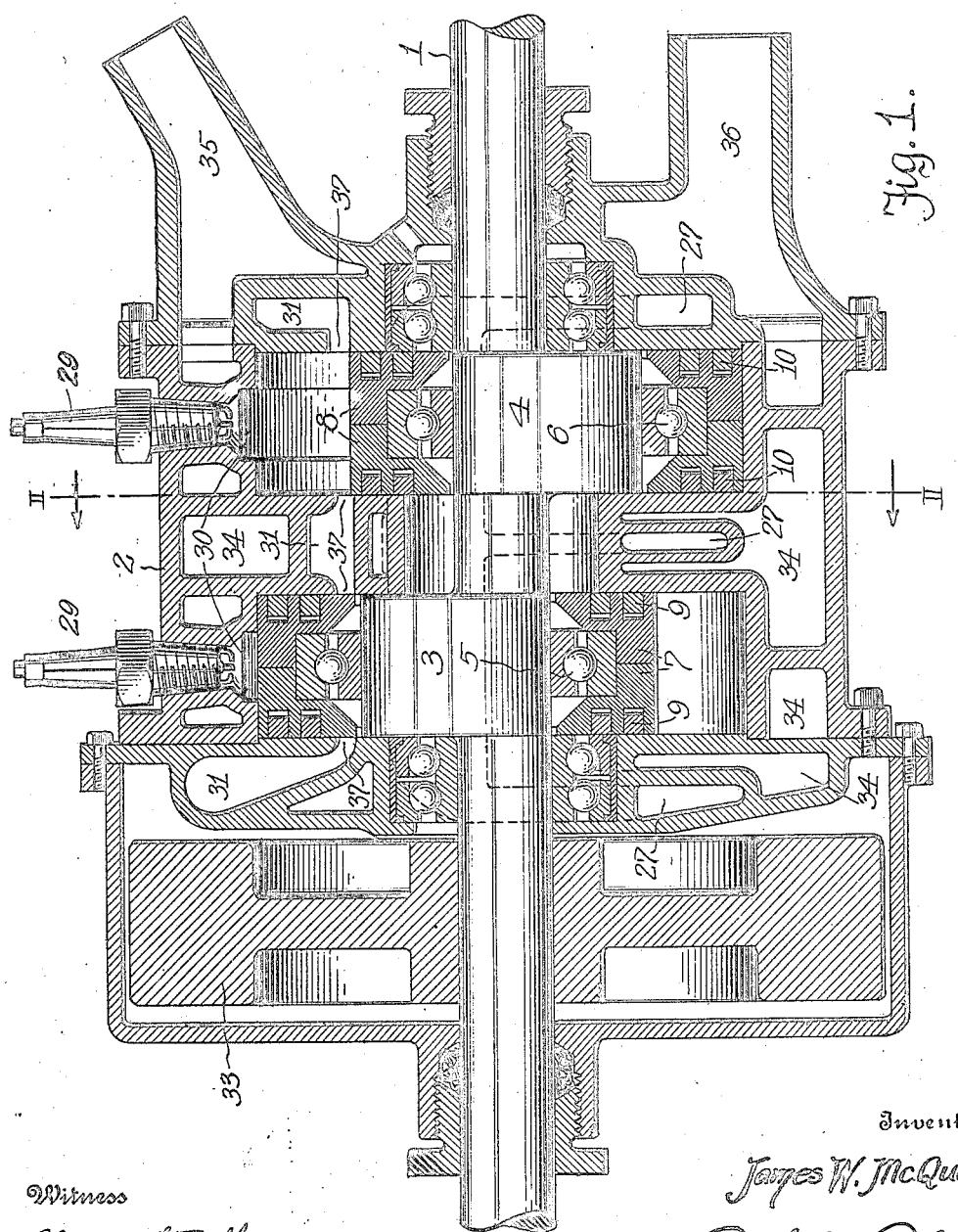
Figure 1 is a view in longitudinal section of a motor embodying features of the invention.
Figure 2:
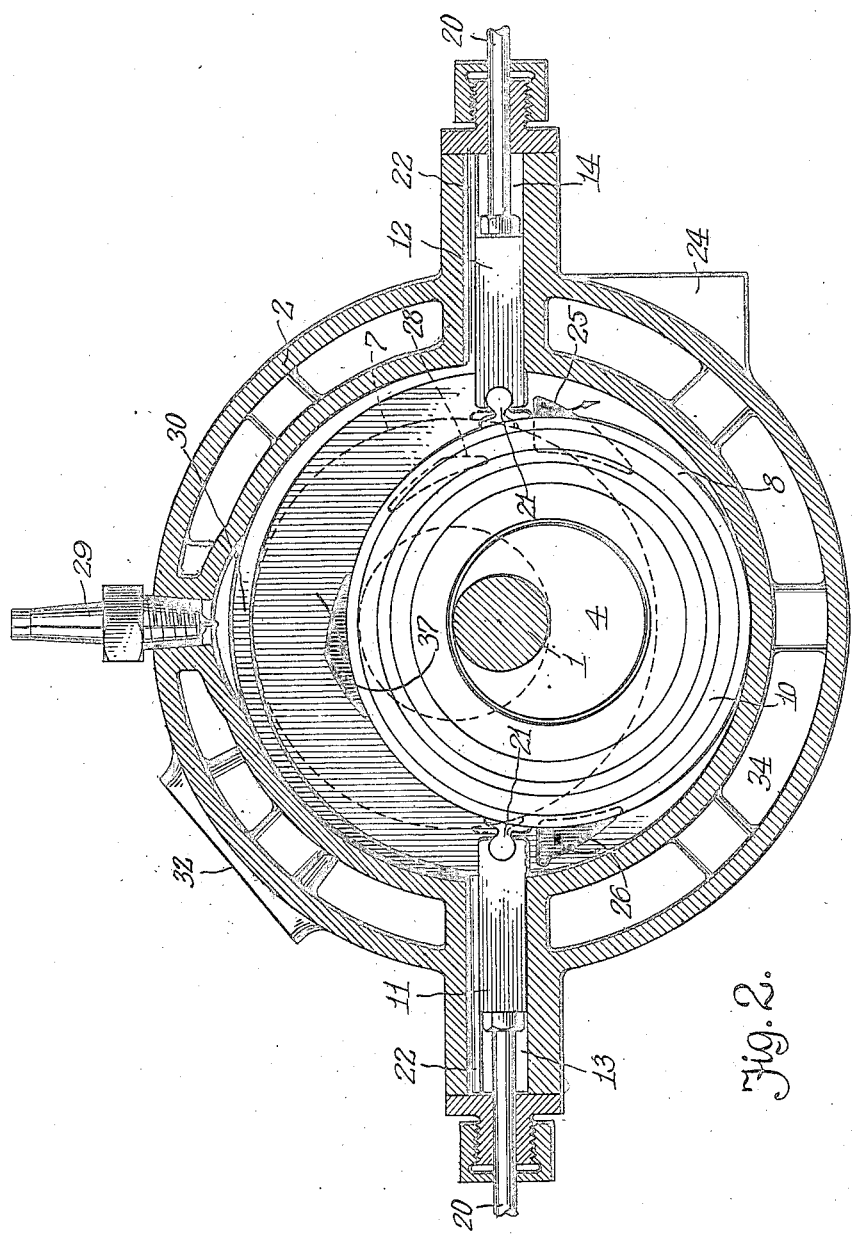
Fig. 2 is a view in cross-section taken in or about line II—II of Fig. 1.
Figure 3:
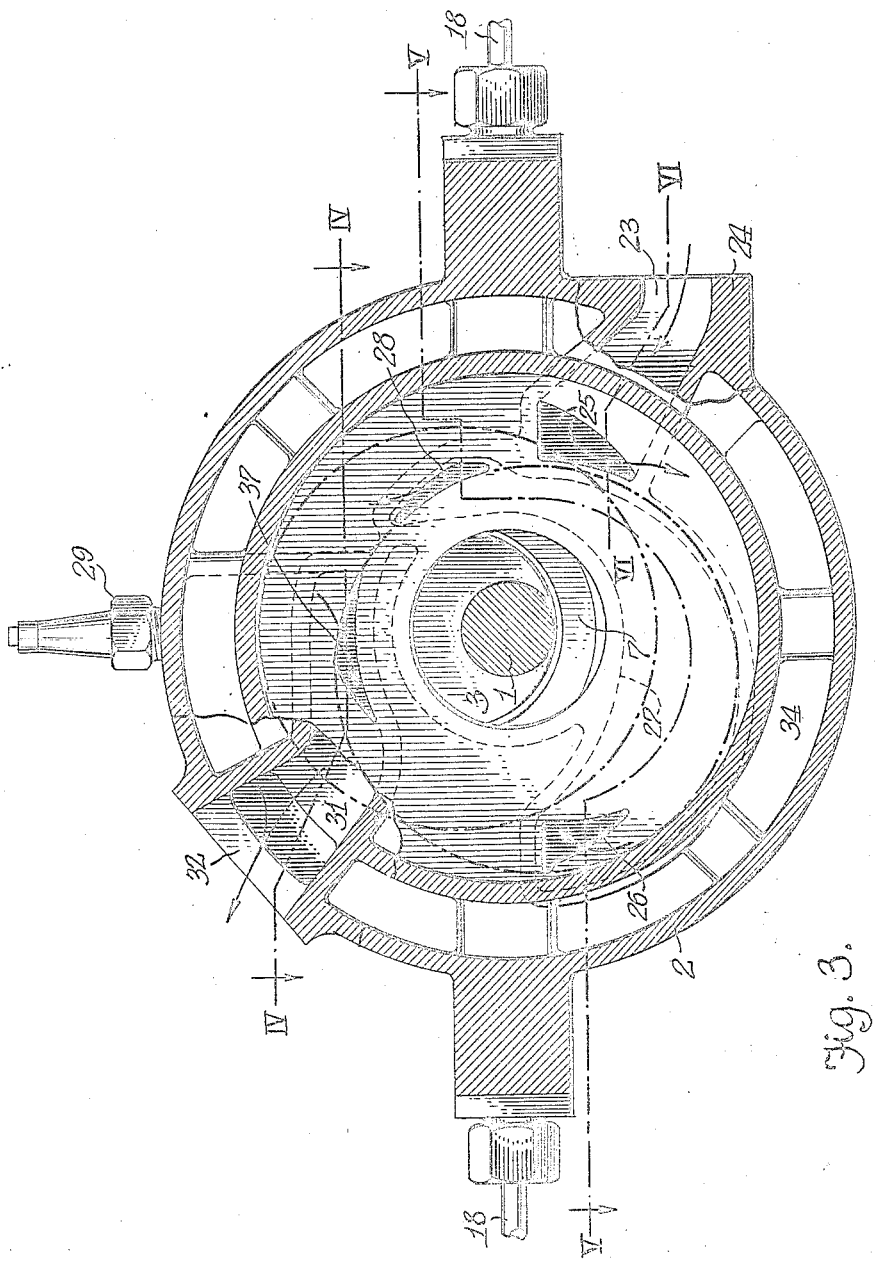
Fig. 3 is a view in cross-section taken on or about line II—II of Fig. 1.

Fig. 9 is a diagram indicating the piston one half a revolution from the position in Fig. 7, with the ports of the compression chamber closed ready for ignition, and the main intake port partly overlapped by the piston; and Fig. 10 is a diagram having the piston at three quarters of a revolution from the piston of Fig. 7, with the intake chamber cut off from the main intake and the compression chamber ports closed during expansion of the fired charge.

As herein illustrated in preferred form, a main shaft 1 is journaled in a suitably designed casing 2 concentrically to one or more pairs of cylinders formed therein. While only one pair is herein depicted, other pairs may be added as desired to increase the power of the motor. An eccentric 3 is secured or formed on the shaft to revolve in one cylinder and another one 4, diametrically opposite to the first, runs in the other cylinder. Ball bearings 5 and 6 on the respective eccentrics maintain outer annular pistons 7 and 8 in rolling contact with the inner peripheral faces of the cylinders, while packing rings 9 and 10 in side grooves of the pistons bear against the side walls of the cylinder and seal the joints. As a matter of mechanical convenience in assembly, the pistons are each formed of oppositely disposed sections which together embrace the outer member of the companion ball-bearing. Or other suitable construction may be followed.

A pair of diametrically opposed abutments 11 and 12 reciprocate in radial slots 13 and 14 of the casing against the piston 7 under the action of a pair of rock arms 15 pivoted on extensions 16 of the casing so that one arm of each rests against an anti-friction roll 17 on a stem 18 of the abutment, the other rocker arms resting on anti-friction rolls 19 on stems 20 of the similar abutments bearing against the other piston 8. The opposite positions of the piston eccentrics thus insure the reciprocation of the abutments, while suitable shoes 21 oscillatory on each conform to the peripheries of the pistons and effect a gas-tight junction. To further avoid leakage, by-passes 22 around the abutments admit any gas under pressure in the upper part of the cylinder against the outer end of the abutments and hold the latter to seat.

A main intake passage 23 through a boss 24 of the casing discharges through lateral ports 25 into the portions of the cylinders below the abutments, which becomes intake chambers, each piston, as it advances from the position of diagram Fig. 7 to the positions of diagrams Figs. 8 and 9, drawing in the charge behind it. Discharge ports 26 in the walls of the intake chamber lead into a compression chamber 27 formed in the casing, both between and at the outer ends of the cylinders. The movement of each piston from the position of diagram Fig. 10 through positions of Fig. 8 and Fig. 7 thus forces the indrawn charge of each intake chamber into the compression chamber, the action alternating because of the opposition of the pistons.

Ports 28 connect the compression chamber with the portion of the cylinders on the sides of the abutments opposite the intake chambers, which thus form explosive chambers. These ports are opened by the pistons as each revolves from the position of Fig. 9 to that of Fig. 7.

Spark plugs 29 in eccentric channels 30 of the concave walls of the explosion chambers, fire the charges therein in timed relation to the engine cycle, through the usual ignition system which is not shown herein, as it is not per se a part of the invention.

After such explosion each piston uncovers exhaust ports 37 which communicate through exhaust ducts 31 with a main exhaust opening 32.

A suitable fly-wheel 33 is provided, which may be encased as indicated, and the usual provisions are made for lubrication and the like while the casing has water passages 34 connecting an outlet 35 with a return opening 36.

As a result, a rotary motor is obtained which is valveless, each piston controlling the ports, and rotating under the influence of the exploded charges injected from the common compression chamber. Any number of pairs of cylinders and pistons may be mounted in the shaft. The rolling contact of the pistons and cylinder walls with the sliding contact of the end packing rings, minimizes leakage and the output of power shows high efficiency, especially in proportion to weight.

Obviously, changes in the details of construction may be made without departing from the spirit of my invention and I do not care to limit myself to the particular form or arrangement of parts.

What I claim is:—

1. An internal combustion motor comprising a pair of axially alined cylinders, a shaft journaled concentrically therethrough, a pair of eccentric pistons secured to the shaft in diametrical-opposite relation each contacting with the side and end walls of a cylinder, a pair of diametrically opposite abutments sliding into each cylinder and contacting with the periphery of the companion piston, connections between the corresponding abutments of the cylinders adapted to reciprocate them alternately, the abutments dividing each cylinder into an intake chamber and an explosion chamber, and a compression chamber having intake ports through the end wall of each intake chamber and outlet ports through the end walls of each explosion chamber, the intake chambers having main intake ports and the explosion chamber having main exhaust ports, the pistons controlling the ports in timed relation to the engine cycle.

2. An internal combustion rotary motor comprising a pair of axially alined cylinders provided each with an eccentric piston contacting with the side and end walls thereof, a shaft on which the pistons are eccentrically secured in diametrically opposite relation, a pair of abutments extending radially into each cylinder and dividing the same into an intake chamber having main intake ports in the end walls controlled by the piston, and an explosion chamber having main exhaust ports in the end walls likewise controlled by the piston, and a compression chamber having intake ports through the end walls from the intake chambers controlled by the pistons and outlet ports into the explosion chambers controlled by the pistons, the corresponding abutments of the two cylinders being interconnected to reciprocate alternately.

3. An internal combustion rotary motor comprising a main casing having a pair of axially alined cylinders, a shaft journaled in the casing through the cylinders concentric therewith, a pair of oppositely disposed eccentric pistons each secured to a shaft in a cylinder in contact with the side and end walls thereof, a pair of abutments sliding in the casing into each cylinder into end contact with the companion eccentric and dividing each cylinder into an intake chamber having main intake ports controlled by the piston and an explosion chamber having main exhaust ports controlled by the piston, the casing having a compression chamber with intake ports from each intake chamber controlled by the companion pistons, and exhaust ports into the explosion chamber controlled by the companion pistons, and means interconnecting the corresponding abutments of the cylinders for reciprocating the abutments alternately.

4. An internal combustion rotary motor comprising a casing having a pair of axially alined cylinders and a compression chamber, a shaft journaled concentrically through the cylinders, a pair of oppositely disposed eccentric pistons secured on the shaft each in contact with the side and end walls of a cylinder, a pair of oppositely disposed abutments reciprocable in the casing in end contact with the periphery of the companion piston, dividing the cylinder into an intake chamber and an explosion chamber, the compression chamber having intake ports from each intake chamber and exhaust ports to each explosion chamber and the intake chambers having main intake ports and the explosion chambers having main exhaust ports, all the ports being controlled by the eccentric pistons, together with means for reciprocating the corresponding abutments of the cylinders alternately.

5. An internal combustion rotary motor comprising a casing having a pair of axially alined cylinders and a compression chamber, a shaft journaled concentrically through the cylinders, a pair of eccentrics oppositely secured on the shaft each in a cylinder, an annular piston journaled on each eccentric in rolling contact with the side and sliding contact with the end walls of the cylinder, a pair of abutments extending into each cylinder with the end faces thereof in contact with the companion piston and dividing the cylinder into an intake chamber having main intake ports and outlet ports into the compression chamber and an explosion chamber having main exhaust ports and intake ports from the explosion chamber, all the ports being controlled by the pistons, and means on the casing interconnecting the corresponding abutments of the cylinders to reciprocate alternately.

6. An internal combustion rotary motor comprising a casing having a pair of axially alined cylinders and a compression chamber, a shaft journaled concentrically through the cylinders, a pair of eccentrics oppositely secured on the shaft each in a cylinder, an annular piston journaled on each eccentric in rolling contact with the side and sliding contact with the end walls of the cylinder, a pair of abutments extending into each cylinder with the end faces thereof in contact with the companion piston and dividing the cylinder into an intake chamber having main intake ports and outlet ports into the compression chamber and an explosion chamber having main exhaust ports and intake ports from the explosion chamber, all the ports being controlled by the pistons, and a pair of rocking beams on the casing each interconnecting the companion abutments.

7. An internal combustion rotary motor comprising a main casing having a pair of axially alined cylinders and a compression chamber, a shaft journaled in the casing concentrically to the cylinders, a pair of oppositely disposed eccentrics each secured on the shaft in a cylinder, an annular piston journaled on each eccentric in rolling contact with the side and sliding contact with the ends thereof, expansion packing rings in the end faces of each piston, a pair of oppositely disposed abutments reciprocable in the casing extending into each chamber into contact with the piston thereof and dividing the cylinder into an intake chamber having main intake ports and outlet ports into the compression chamber, and an explosion chamber having main exhaust ports and intake ports from the compression chamber, all the ports of the chambers being controlled by the companion piston, the casing having passages admitting the contents of the explosion chamber against the outer end faces of the abutments, and means interconnecting the corresponding abutments of the cylinders to reciprocate alternately.

8. An internal combustion rotary motor comprising a main casing having a pair of axially alined cylinders and a compression chamber surrounded by water jacketed walls, a shaft journaled in the casing concentrically through the cylinders, a pair of oppositely disposed pistons journaled eccentrically on the shaft each in rolling contact with the side and sliding contact with the end walls of the cylinder, means for packing the joints between the side walls and the pistons, a pair of abutments for each cylinder reciprocable in guide-ways of the casing, a pair of rock arms on the casing connecting the companion abutments of the cylinders to reciprocate alternately in sliding contact at the inner end portions with the piston peripheries, and means on the abutment ends for maintaining close joints with the pistons, each pair of abutments dividing the companion cylinder into an intake chamber having main intake ports and outlet ports into the compression chamber and an explosion chamber having main exhaust ports and intake ports from the compression chamber, the pistons controlling all the ports.

9. In an internal combustion motor, a casing having a cylinder therein and a compression chamber, a shaft journaled in the casing concentric with the cylinder, a cylindrical piston secured eccentrically on the shaft in the cylinder in rolling contact with the side and sliding contact with the end walls thereof, abutments reciprocating into the cylinder and dividing the same into an intake chamber having main intake ports and outlet ports into the compression chamber, and an explosion chamber having main exhaust ports and intake ports from the compression chamber, together with means sealing the joints between the piston and cylinder walls and between the piston and the abutments and the piston being adapted and disposed to seal the ports in proper timed relation to the piston movement.

10. An internal combustion rotary motor comprising a main casing having a pair of axially alined cylinders and a compression chamber, a shaft journaled in the casing concentrically through the cylinders, a pair of oppositely disposed eccentrics each secured on the shaft in a cylinder, an anti-friction bearing mounted on each eccentric, a pair of oppositely disposed annular sections on the outer member of each bearing forming a piston in rolling contact with the side and sliding contact with the end walls of the companion cylinder, a pair of diametrically opposite abutments longitudinally reciprocable in the casing contacting at the inner ends with the section peripheries and dividing the cylinder into an intake chamber having main intake ports and outlet ports into the compression chamber and an explosion chamber having main exhaust ports and intake ports from the compression chamber, the piston controlling the ports, and means connecting the corresponding abutments of the cylinders to reciprocate them alternately.

11. An internal combustion rotary motor comprising a pair of axially alined cylinders, a pair of oppositely disposed pistons revolving eccentrically each in a cylinder, a pair of oppositely disposed abutments reciprocable in the casing contacting at the inner end portions with the companion piston peripheries and rock arms on the casing connecting the outer end portions of the abutments, the pistons and rock arms co-operating to reciprocate the abutments, the casing having guideways for the abutments and having configurations to form channels of communication between the compression sides of the cylinders and the spaces between the casing wall and outer end faces of the abutments.

12. An internal combustion motor having a chamber, an eccentrically-mounted element movable in an advancing direction in said chamber in contact with the periphery of the chamber and constituting a piston, said chamber and piston having opposing faces each of which is of circular contour with the faces differing as to length of radius, movable mechanism co-operating with the element to divide the chamber into compartments, a fuel supply, and means for successively introducing the fuel by suction action, compressing the fuel within one of such compartments to form the charge, igniting the charge, and exhausting the resultant gases during a period not greater than that required by the element to complete its traversing contact with the chamber periphery.

13. A motor of the type of claim 12 characterized in that the fuel is temporarily passed from the chamber subsequent to its introduction into the chamber and prior to its ignition therein.

14. A motor of the type of claim 12 characterized in that the fuel is temporarily passed from the chamber subsequent to its introduction into the chamber and prior to its ignition therein, the temporarily-displaced fuel being subjected to compression while absent from the chamber.

In testimony whereof I affix my signature in presence of two witnesses.

JAMES W. McQUEEN.

Witnesses:
CHESTER I. MONROE,
LETHA J. HUNT.